INVENTORS
STEN OLOV LIDÉN
ARVID RICHARD PETRÉN
JOHN STURE SWENSON

ATTORNEYS

Fig. 6

INVENTORS
STEN OLOV LIDÉN
ARVID RICKARD PETRÉN
JOHN STURE SWENSON

ATTORNEYS

Fig. 12

# United States Patent Office 2,788,658
Patented Apr. 16, 1957

2,788,658

APPARATUS FOR INDICATING AND LOCALIZING LEAKS IN GAS-PRESSURE PROTECTED CABLES

Sten Olov Lidén, Enskede, Arvid Rickard Petrén, Stuvsta, and John Sture Swenson, Stockholm, Sweden, assignors to Telefonaktiebolaget L M Ericsson, Stockholm, Sweden, a company of Sweden Application November 28, 1952, Serial No. 322,854

12 Claims. (Cl. 73—40.5)

During the past years it has become more and more common to equip telecommunication cables, particularly coaxial cables, with a so-called gas-pressure protector against humidity penetrating through leaks arising in the cable sheath. A suitable gas, usually nitrogen, is compressed into the cables at a pressure suitable for the cable. In case a leak arises the escaping gas flows for a long period thereby preventing humidity from penetrating into the cable. For controlling the pressure and for indicating leaks, the cables are provided with some kind of contact manometers, which start to function when the pressure falls below a certain value, the so-called alarm pressure. The localization of the leaks is generally done by measuring the pressure of the gas at certain points on the cable sections. Localization by means of gas flow measurements has also been practised previously.

The present invention relates to devices for gas pressure protection, comprising a combination of gas reserve, signal manometer, reducing valve and alarm devices arranged in such a way that not only indication but also localization of gas leaks are automatically obtained simultaneously with an integrating measuring of the volume of the escaping gases. Signal manometers and reducing valves are thereby utilized in a new manner particularly adapted for the purpose.

However, present systems for gas-pressure protection are usually not provided with gas reserves and therefore there is no possibility of replacing the gas escaping through the leaks. For a small leak causing a steady reduction of the pressure level, it can therefore happen that the pressure in the cable falls to the alarm pressure along the whole pressure section. If for any reason a greater fault arises on the cable, it is true, that alarm will be given almost immediately, but the protection effect of the gas has then been considerably reduced. This condition is a considerable disadvantage, particularly for cables having small gas capacity and low gas flow resistance.

In the figures are shown examples of how a system for gas-pressure protection can be utilized according to the invention and the details embodied herewith.

Figure 1:
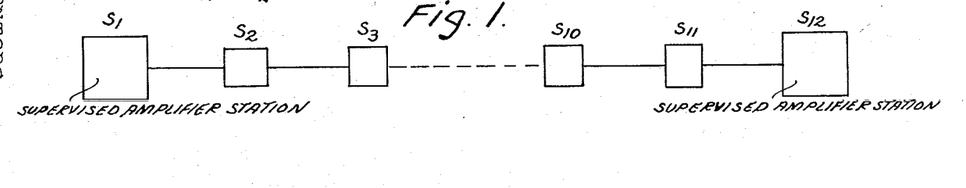
Fig. 1 shows schematically a coaxial cable installation comprising two supervised amplifier stations $S_1$ and $S_{12}$ and ten unmanned amplifier stations $S_2$–$S_{11}$, among other things provided with corresponding signal manometers $SM_1$–$SM_{12}$ (not shown).
Figure 2:
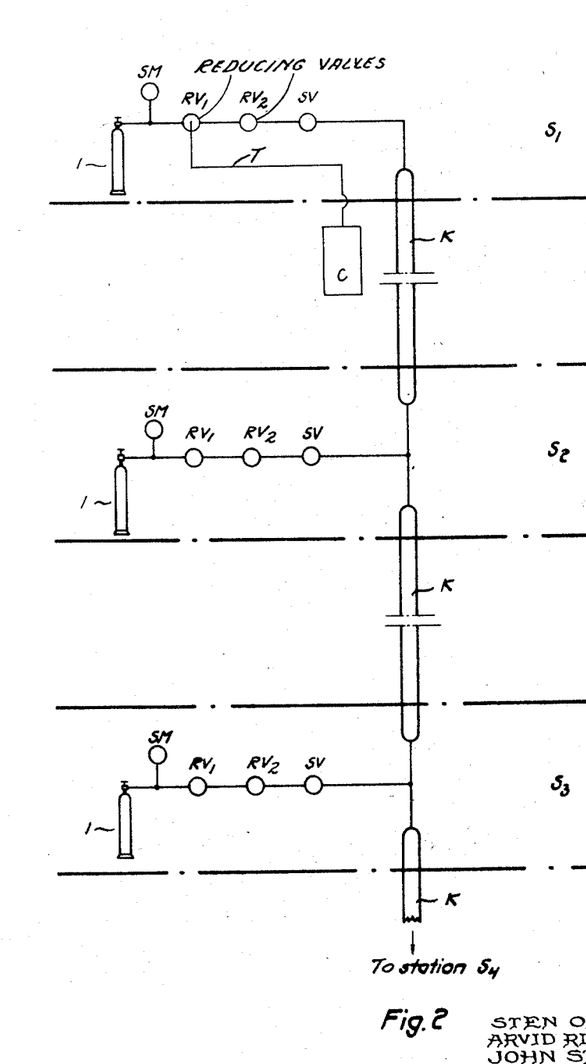
Fig. 2 shows schematically part of a cable section between points $S_1$, $S_2$, and $S_3$ with arrangements according to the invention installed therein.

The mechanical construction of the gas-pressure protection device for three stations is shown in Fig. 2. The high pressure containers (the gas receptacles) and the cable are designated 1 and K respectively. The gas used is nitrogen. SM is a signal manometer, showing the pressure in the container 1 and giving indication for e. g. every 3rd kg./cm.² fall of pressure. Its construction will be described further on. $RV_1$ and $RV_2$ are reducing valves. $RV_1$ reduces the high pressure from the gas receptacle to a pressure of 3 kg./cm.² above atmospheric, which pressure is reduced by $RV_2$ to a value suitable for the cable, e. g. a pressure of 0.6 kg./cm.² above atmospheric. SV is a safety-valve. When a leak develops, say between the stations $S_2$ and $S_3$, gas will flow to the cable from the gas receptacles of these stations and naturally more gas from the receptacle located nearer to the leak. The reducing valves $RV_2$ are adjusted to reduce to the same pressure.

Figure 3:
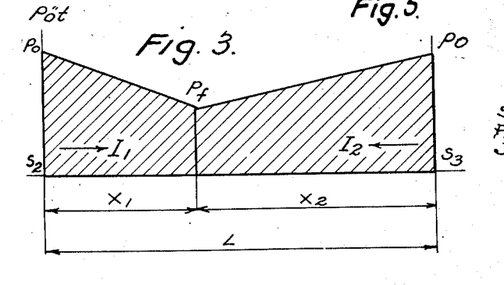
Fig. 3 shows a diagram of the pressure $P_0$ in the cable section $S_2S_3$ as a function of the length L of the cable when a leak has arisen.

Fig. 3 shows a diagram of the pressure $P_0$ in the cable section between $S_2$ and $S_3$ at zero flow conditions as a function of the length L of the cable. Assuming there is a leak at the border between $x_1$ and $x_2$. The distances $x_1$ and $x_2$ from the stations $S_2$ and $S_3$ respectively are a function of the gas flow currents $I_1$ and $I_2$. The distances $$x_1 = \frac{I_2}{I_1+I_2} \cdot L$$

and $$x_2 = \frac{I_1}{I_1+I_2} \cdot L$$

It is therefore a question of determining $I_1$ and $I_2$. On account of, among other things, the temperature variations at the stations $S_2$ and $S_3$, influencing the reducing valves $RV_2$, the currents $I_1$ and $I_2$ can become pulsating. The current values used for calculating $x_1$ and $x_2$ must be mean values. The current $I_1$ causes a fall of pressure in the container 1 of $S_2$ (see Fig. 2). The signal manometer SM of $S_2$ will indicate for e. g. every 3rd kg./cm.² fall of pressure. The current $I_1$ expressed in litres/minute of 1 kg./cm.² will be $$I_1 = \frac{n_1 \cdot p_1 \cdot v_1}{t_1}$$

and $$I_2 = \frac{n_2 \cdot p_2 \cdot v_2}{t_2}$$

where $n_1$ = number of indications from the signal manometer SM of $S_2$, $n_2$ = number of indications from the signal manometer SM of $S_3$, $p_1$ = fall of pressure in container 1 of $S_2$ for every indication, expressed in kg./cm.², $p_2$ = fall of pressure in container 1 of $S_3$ for every indication, expressed in kg./cm.², $v_1$ = volume in litres of receptacle 1 of $S_2$, $v_2$ = volume in litres of receptacle 1 of $S_3$, $t_1$ = time in minutes during which $n_1$ has been noted, $t_2$ = time in minutes during which $n_2$ has been noted.

For $$p_1 = p_2; \quad v_1 = v_2; \quad t_1 = t_2$$

we have $$x_1 = \frac{n_2}{n_1 + n_2} \cdot L$$

and $$x_2 = \frac{n_1}{n_1 + n_2} \cdot L$$

Figure 4:
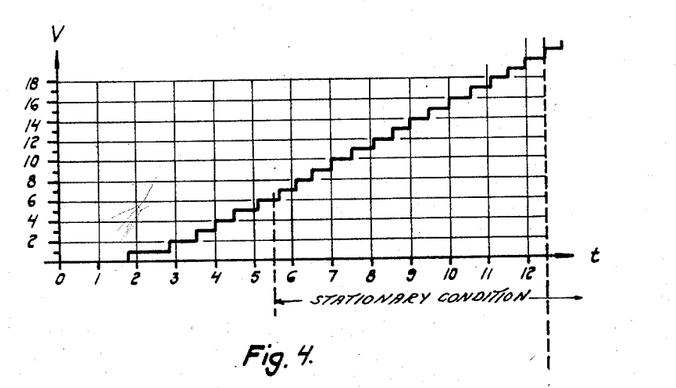
Figs. 4 and 5 show examples of recordings of escaping gas volumes from two stations $S_2$ and $S_3$ recorded according to the invention.

Fig. 4 shows graphically the gas volume V escaping from the station $S_2$ as a function of the time $t$ registered through impulses in the pulse counter.

Figure 5:
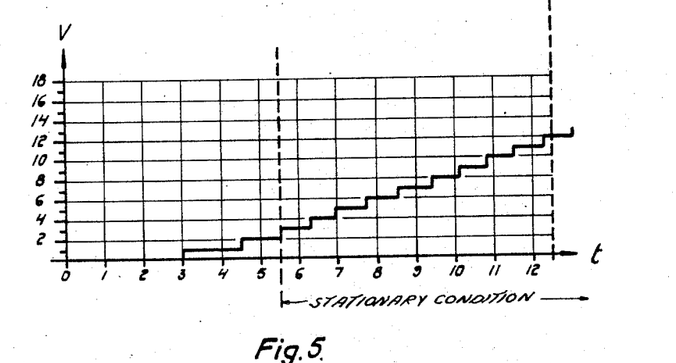

Fig. 5 shows the same qualities at the station $S_3$. It is assumed that a leak has arisen at the point of time $t=0$. The distance to the leak from $S_2$ is $$x_1 = \frac{9\frac{1}{3} \cdot L}{9\frac{1}{3} + 14\frac{1}{4}} = 0.4 \cdot L$$

Owing to the integrating measuring of the escaping gas volume, i. e. summing up the number of registered impulses, a very good approximation of the actual position of the leak is obtained.

Figure 6:
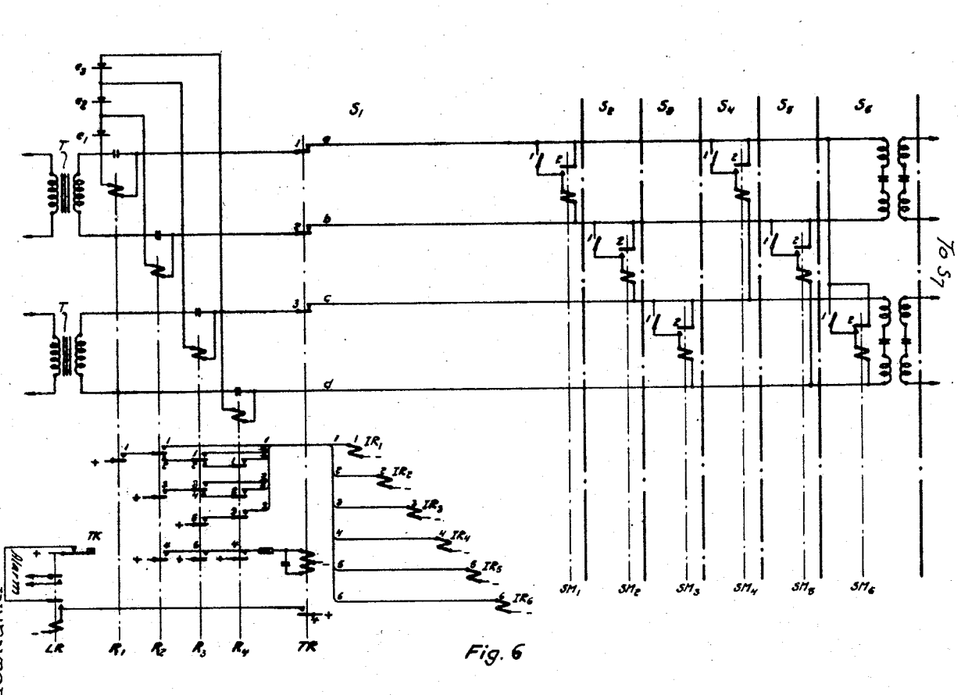
Fig. 6 shows a principal diagram of the construction of the alarming and indicating system, whereby only six amplifier stations are indicated in a system having twelve stations.

Fig. 6 shows a principal diagram of the construction of the alarming and indicating system, where only six amplifier stations ($S_1$–$S_6$) are shown in a system of twelve stations. The station $S_1$ is supervised and provided with equipment for controlling the unmanned stations $S_2$–$S_6$. Indications from any of the unmanned stations $S_7$–$S_{11}$ are transferred to the supervised station $S_{12}$. For the transferring of the indications, four wires are used going from $S_1$ through all unmanned stations on to $S_{12}$. The wires can likewise be used as speech wires (suitably official service lines). By connecting transformers and condensers at the station 6 the system is divided into two halves in respect to its D. C.-content.

The stations $S_1$ and $S_{12}$ are each provided with: one alarm relay LR, push button TK, slow releasing relay TR, the relays $R_1$–$R_4$, the impulse relays $IR_1$–$IR_6$, the current sources $e_1$–$e_3$ and 2 transformers T. The stations $S_2$–$S_{11}$ are each provided with one signal manometer SM. The station $S_6$ is in addition provided with 2 transformers and 4 condensers. Moreover, the system is provided with four leads $a$, $b$, $c$, $d$ from the station $S_1$ through all stations to the station $S_{12}$.

Assuming that a leak arises between the stations $S_4$ and $S_5$. When so much gas has escaped from the cable that the pressure in the gas receptacle at the station $S_4$ has fallen to such an extent that the contact 1 of the signal manometer $SM_4$ closes, a current is obtained through the relay winding of $R_1$, the contact 1 of TR, the lead $c$, the contact 3 of TR, the winding of $R_3$, $e_2$, $e_1$. The holding contact 2 of $SM_4$ closes. $R_1$ and $R_3$ are attracted and a current is obtained from the positive terminal over the contact 1 of $R_1$, contact 2 of $R_2$, contact 1 of $R_3$, the wire 4 and through the winding of $IR_4$ to the negative terminal. The impulse counter $IR_4$ operates. The closing of $R_3$ causes a current from the positive terminal over the contact 6 of $R_3$ through a resistance and the winding of the slow releasing relay TR to the negative terminal. The contact 4 of TR is hereby closed and an alarm relay connects up. However, the contacts 1, 2 and 3 of TR are simultaneously broken, whereby the relays $R_1$, $R_3$ and $SM_4$ break. The disconnection of $R_1$ and $R_3$ interrupts the current to $IR_4$, which breaks and moves its counting apparatus one step forward. The disconnection of $SM_4$ breaks its contact 2 and readjusts its contact 1 for a renewed closing at somewhat lower pressure in the gas receptacle (e. g. 3 kg./cm.² lower pressure). When $R_3$ disconnects its contact 6 breaks the current to TR, which releases after slow action. LR disconnects when the alarm signal is cut off by manually pushing in the push button TK. When the pressure in the gas receptacle has fallen an additional 3 kg./cm.² the contact 1 of $SM_4$ closes again and $IR_4$ starts counting again. A signal manometer $SM_5$ at the station $S_5$ operates in the same manner. The indications of $SM_5$ are registered by $IR_5$. The number of impulses from the two signal manometers per unit of time is of course dependent on the position of the fault on the cable.

The example shown in Fig. 6 is only intended as an illustration and can be varied in different details without exceeding the scope of the invention. For instance the lead from the alarm relay LR can, instead of being connected to the closing contact 4 of the relay TR, be connected to the parallel connected closing contacts of all impulse counters IR. Every closing contact of IR can be arranged in such a way that, influenced by a zero adjustable cog-segment, it closes only after e. g. the 3rd impulse to each impulse counter. It is hereby gained that separate indicating impulses are not causing alarm while, on the other hand, a leak giving rise to a series of indicating impulses, causes alarm in good time before the gas receptacle is emptied. One can also conceive a combination of these two couplings, whereby the closing contact of TR is connected in parallel with the closing contacts of IR via a manually operated switch.

Figure 7:
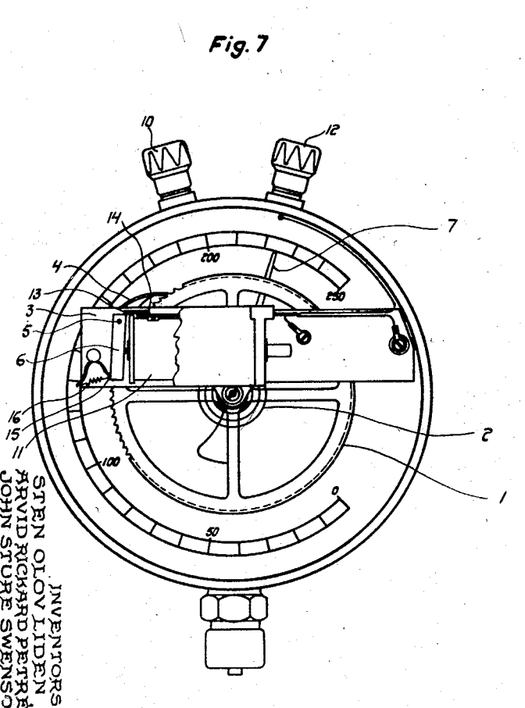
Figs. 7 and 8 show a special signal manometer, which can be used as a pressure indicator in the gas-protector system, viewed from the front and from the side respectively.
Figures 8, 9:
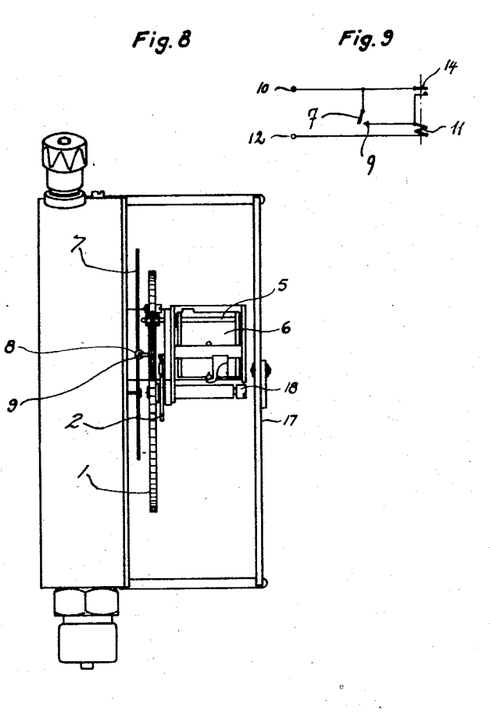
Fig. 9 shows a principal diagram for the manometer according to Figs. 7 and 8.

The signal manometer used, comprises a pointer manometer with a remote indicating device mounted on the same, which is constructed in such a way that it can after unimportant changes be mounted on a pointer instrument for either increasing or decreasing measuring value. A description will as an example be given here of a remote indicating device mounted on a manometer. Figs. 7 and 8 show the mechanical construction of the signal manometer and Fig. 9 a principal diagram of the electrical part.

The operation of the signal manometer is the following: A cog-wheel 1 will rotate counter-clockwise by the influence of a spiral spring 2, but is prevented by the springing hook 4 of a releasing arm 3. The shaft 5 of the releasing arm is firmly connected with a relay armature 6. When the manometer pointer 7 at fall of pressure moves counter-clockwise, a contact plate 8 will make contact with a pin 9 fastened to the cog-wheel 1. Through this the following circuit is closed: (see Fig. 9) terminal—manometer pointer 7—the contact pin 9 of the cog-wheel—relay winding 11—terminal 12. The relay armature 6 operates and an armature arm 13 influences a relay spring 14 so that its contact is closed, whereby a circuit closing in parallel to that between the pointer 7, and the cog-wheel is obtained. When the relay armature 6 (see Fig. 8) operates, it turns the shaft 5 and thereby the releasing arm 3 so that its hook 15 works into the cog-wheel 1 right between two cogs. The springing hook 4 of the releasing arm is turned out of the gear 1, which thus is released and turns half a cog distance when the hook 15 blocks its motion. When the voltage is removed from the terminals 10 and 12 (e. g. automatically after registering the current close) the relay armature 6 releases and is by a spring 16 pulled to its off position. The relay armature 6 thus turns the shaft 5 and thereby the releasing arm 3 so that its springing hook 4 works into the cog-wheel 1 right between two cogs. The hook 15 of the releasing arm is turned out of its meshing with the cog-wheel 1, which thus is released and turns half a cog-distance when the springing hook 4 of the releasing arm blocks its motion. At the release of the relay armature the relay contact 14 is switched off through the influence of the armature arm 13. The terminals 10 and 12 are again energized (e. g. automatically after the elapse of the slow releasing time for a relay) and the device is ready for a new closing of the pointer contact, when the procedure is repeated.

When an emptied gas container is replaced by a filled one, the pointer moves clockwise to its higher pressure value. The cog-wheel is moved clockwise by means of a screw driver, which is inserted through the centre hole in the glass 17 and is applied to the slot in the lock ring 18 of the cog-wheel shaft. For a clockwise motion of the cog-wheel 1 the springing hook 4 of the releasing arm 3 is pushed aside by the cogs and the spiral spring is tightened.

Figures 10, 11:
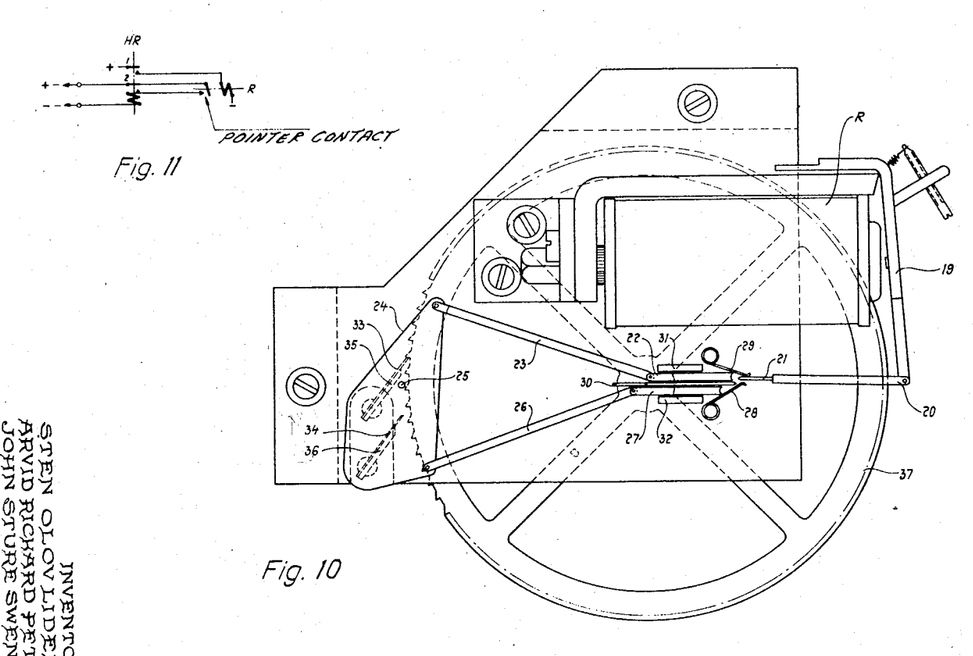
Fig. 10 shows a modification of the remote indicating device for the signal manometer, the auxiliary relay and instrument pointer being omitted.
Fig. 11 shows a principal diagram of Fig. 10.

In the described remote indicating device the cog-wheel is turned a whole cog-distance for each indication. In order to further increase the exactness of the described integrating measuring method the cog-distance can be reduced in said cog-wheel to e. g. half the cog-distance mentioned in connection with the previous example. Such a device will, however, meet with difficulties from manufacturing and technical aspects, since greater precision is required for the production of the whole remote indicating device, which will involve a considerable increase of the manufacturing costs. According to the invention, the first mentioned advantage will be arrived at without the later mentioned disadvantage by changing the operation of the releasing arm by means of interconnected links, directed by certain springs. An indication is by this means obtained for every half cog-distance by keeping the same simple cog-wheel as before. Fig. 10 shows such a modified example, where the cog-wheel is turned only half the cog-distance for each indication.

Fig. 11 shows a modified principal diagram of the electrical part.

The operation is the following: When the pointer contact, shown in Fig. 11, is closed a current is obtained through an auxiliary relay HR which operates and closes its contacts 1 and 2. The closing of contact 1 causes switching in of a relay R, which influences the releasing arm 24 of the remote indicating device. After registering the indication, the current is broken to the relay HR, which disconnects. When its contact 1 breaks the relay R disconnects. For every closing of the pointer contact or for every indication, the relay R switches on or off. When the armature 19 (see Fig. 10) of the relay R operates, the pin 20 with its tapering end 21 is affected, which via links 22 and 23 operates the releasing arm 24, which is movable around the shaft 25. The releasing arm 24 affects the pin 26 which moves the link 27 to the right, whereby the spring 28 is bent aside. The spring 29 has lost its support against the link 22 and pushes against the pin 21 which is pressed against the fixed support 30. When the armature of the relay R releases, the pin 21 is pulled out, so that its point loses its support against 30 and the spring 29 moves 21 over against the spring 28, which has been moved aside by the link 27. The pin 21 will point at the link 27 and at next switching on of the relay the pin 21 will via the links 27 and 26 turn the releasing arm 24 in the opposite direction. After switching off the relay the part will assume the positions shown in Fig. 10. The parts 31 and 32 are fixed supports for the links 22 and 27 respectively. The releasing arm 24 is provided with two springing hooks 33 and 34, which are supporting against the stiffenings 35 and 36 respectively. The hooks are arranged in such a way, that when the cog-wheel is released by one hook, the other has already worked in right between two cogs. The cog-wheel 37 will turn counter-clockwise by the influence of a spiral spring (not shown in Fig. 10). The cog-wheel is turned clockwise by manually pulling a wire, which is wound some turns clockwise around a pulley, which is fastened to the cog-wheel shaft (not shown).

Figure 12:
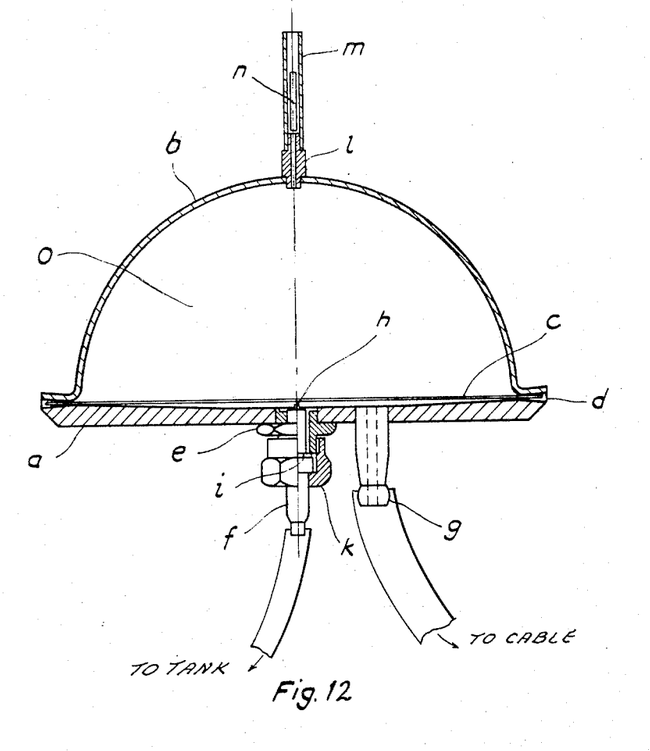
Fig. 12 shows an example of a reducing valve.

An example of a reducing valve for the regulation of pressures above atmospheric, which is used according to the invention, is further explained in connection with Fig. 12.

The valve comprises a bed plate $a$, the inner side of which is somewhat concave, a half spherical shaped cap $b$ and a diaphragm $c$ situated between them. The bed plate, the diaphragm and the cap are absolutely gas-tightly joined together with each other through soldering at the joint $d$. To the bed plate are fastened by means of hard soldering a valve-housing $e$, intended for a car tubing valve $f$, and a tubing nipple $g$ by which the reducing valve is connected with the cable through a tubing. The valve $f$ is placed in such a way that a valve needle $h$, influencing the valve cone, faces towards the diaphragm $c$. The closure between valve and valve-housing is done by an aluminum packing $i$. The valve is pressed against the packing by an overshot nut $k$. A piece of metal $l$, which forms a seat for soldering a copper-tube $m$, is bored through and fastened to the cap by hard soldering. A plug $n$ of lead or aluminum, being somewhat less than the inside diameter of the copper-tube, has been placed in the copper tube. The pressure chamber $o$ is filled with gas through the tube $m$ to the pressure to which it is to be reduced by the reducing valve. The tube $m$ is thereafter squeezed together, whereby the lead plug stops up the tube. The rubber tubing is removed and the mouth of the copper-tube is squeezed together and soldered. In case the pressure in the pressure chamber is to be changed, the copper-tube is unsoldered and a new copper-tube is soldered and provided with a lead plug, whereafter adjustment of the pressure can be done.

The operation of the reducing valve is the following: In case the pressure below the diaphragm $c$ is lower than the pressure in the pressure chamber $o$, the diaphragm $c$ is bent downwards and presses the needle $h$ inwards, which opens the valve cone and lets the gas in below the diaphragm, from where the gas is conducted through the tube $g$ to the cable. When the pressure below the diaphragm has increased to the same value which is prevailing in the pressure chamber $o$, the diaphragm $c$ resumes its original position and the needle $h$ is not affected, wherefore the valve closes.

Inasmuch as it is the pressure in the pressure chamber $o$ which determines the pressure value to which the valve is to reduce, it is of importance that the pressure chamber is absolutely gas-tight. This has been accomplished by soldering the joint $d$ and by soldering the mouth of the tube $m$. On account of the pressure in the chamber $o$ the latter soldering cannot be performed until after an initial stopping up of the tube $m$ by squeezing the same together at the place where the plug $n$ is put in.

When the pressure below the diaphragm has increased to the same value as that of the pressure chamber $o$, it is required that the valve closes completely. To avoid rejecting the whole reducing valve assembly on occurrence of leak faults with the valve $f$, the latter has been made replaceable.

Figure 13:
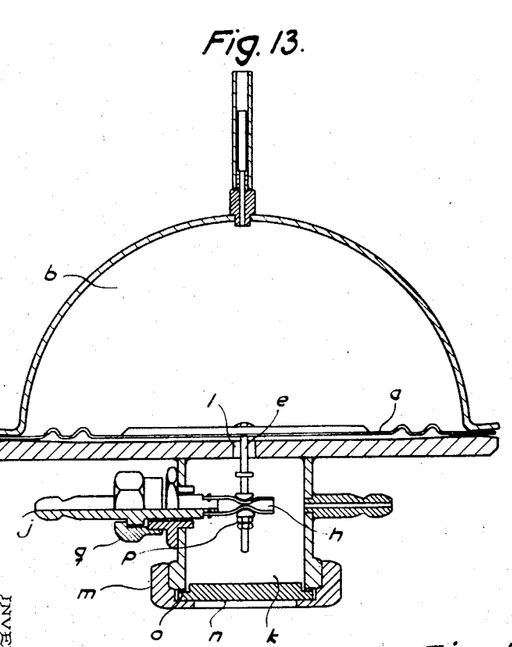
Figs. 13 and 14 show in views at right angles to each other a further embodiment of a reducing valve.

Fig. 13 shows a modified reducing valve, where the replaceability has been solved in another way.

Figure 14:
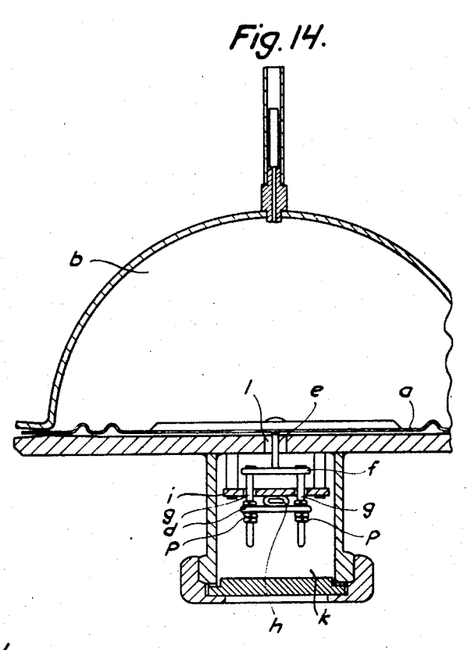

Fig. 14 is a side view of Fig. 13. The operation of the valve is the following: in case the pressure below the diaphragm $a$ is lower than the pressure in the pressure chamber $b$, the diaphragm $a$ bends downwards and presses down the cross-piece $d$ via the details $e$, $f$ and $g$. The rubber or plastic tubing $h$, lying squeezed together between the fixed cross-piece $i$ and the cross-piece $d$, movably connected with the diaphragm $a$, opens thereby for the entrance channel $j$. The space $k$ is through the hole $l$ connected with the under side of the diaphragm. Therefore, the valve comprises a tubing $h$ the squeezing together of which is directed by the diaphragm $a$. When replacing the tubing the overshot nut $m$ is loosened and the plate $n$ with the packing $o$ are removed. The nuts $p$ and the cross-piece $d$ are removed, whereafter the overshot nut $q$ is unscrewed and the mouthpiece with the tubing $h$ is released. After replacing the tubing $h$ the assembling is merely a reversal of the above procedure.

If the pressure chamber $b$ is subjected to temperature variations the pressure in $b$ will vary somewhat which will result in a variation in the pressure to which the reducing valve reduces. In order to reduce the influence of the temperature variations, the following modification can be made: The pressure chamber as shown in Fig. 2 is by means of a tube $t$ connected with a container $c$, the volume of which is considerably greater than that of the pressure chamber. This container is sunk in the ground, suitably close to the cable. When the temperature of the cable and thus the pressure is changed, an advantage is gained since the reducing valve will in a corresponding degree also change the pressure to which it reduces by means of which the harmful influence of the temperature change is broadly speaking eliminated.

The described remote indicating device for the manometer can also be used for other pointer instruments than the manometer.

We claim:

1. For use with a gas-pressure protected cable, to which a compressed gas reservoir is connected through a pressure regulator to one end of a designated section of the cable, apparatus to indicate and localize leaks comprising, in combination, a gas pressure manometer connected to the reservoir ahead of the regulator to indicate the initial gas pressure therein and reduced pressures due to cable leakage, means on said manometer adapted to be engaged for each predetermined increment of pressure reduction and signalling means arranged to be triggered by said manometer means each time the indication thereof is reduced by said predetermined increment.

2. The apparatus as defined in claim 1 in which said signalling means comprises an electric circuit and pulse forming contact means therefor actuated by said manometer means.

3. Apparatus as defined in claim 2 in which pulse counting means are remotely positioned from and actuated by the pulse forming contact means over said electric circuit.

4. The apparatus as defined in claim 1 in which the pressure regulator interposed between said cable and the manometer includes a diaphragm, a chamber closed by said diaphragm and confining a gas under pressure, a chamber on the opposite side of said diaphragm to receive the gas whose pressure is to be regulated, and a valve actuated by said diaphragm to control the flow of gas to said last mentioned chamber.

5. The apparatus as defined in claim 4 in which the pressure regulator gas chamber is in communication with a tank whose volume is considerably greater than that of the chamber and means to keep the tank temperature substantially constant.

6. The apparatus as defined in claim 5 in which said tank is buried in the ground adjacent the said cable.

7. For use with a gas-pressure protected cable, to which a number of compressed gas reservoirs are connected, one at each of a plurality of spaced stations, to indicate and localize leaks; apparatus comprising, in combination, a gas pressure manometer connected to each reservoir to indicate initial gas pressure therein and successively reduced incremental pressures due to cable leakage, means for producing an electric impulse each time the manometer indication is reduced by a predetermined increment from the preceding impulse producing pressure, and an electric impulse counter connected to be actuated by said impulse from said means.

8. The apparatus as defined in claim 7 in which said manometer has a pointer and said means is equipped with a contact movable in a path coincident with the pointer, and means actuated as a result of each engagement between the pointer and contact to adjust the contact to a position representative of a predetermined increment of pressure reduction by its distance from the previous engaged position.

9. Apparatus as defined in claim 8 in which said impulse counter is remotely positioned from said manometer and conductors in said cable connecting the manometer and impulse counter together.

10. Apparatus as defined in claim 7 in which a pressure reducer is interposed between said cable and the manometer, which reducer makes use of a gas confined under pressure on one side of a diaphragm to determine the regulated pressure on the other side thereof for delivery to the cable, and means compensating the confined gas for cable temperature.

11. The apparatus of claim 10 in which said compensation is effected by a tank of said confined gas connected to said side of the diaphragm and buried in the earth adjacent said cable.

12. An arrangement for indicating the existance and providing the information for locating the position of a leak in a single gas-pressure protected cable, to which a number of similar sized compressed gas reserves are connected at suitable intervals along the length of the cable, characterized by a gas-pressure at each reserve and a summing impulse counter at a central station for each gas reserve, and a relay arrangement and circuits, means in each manometer constructed to transmit an electric impulse to its impulse counter via the relay arrangement upon each fixed incremental reduction in gas pressure in its gas reserve, so that each impulse counter effects a summation of the volume of gas escaping from its gas reserve whereby a gas leak can be localized by comparing the number of impulses on the impulse counters on opposite ends of the cable section leaking gas.

References Cited in the file of this patent

UNITED STATES PATENTS

| | | |
|---|---|---|
| 1,853,882 | Roper | Apr. 12, 1932 |
| 1,904,226 | Henneberger | Apr. 18, 1933 |
| 1,985,348 | Henneberger | Dec. 25, 1934 |
| 2,092,560 | Runaldue | Sept. 7, 1937 |
| 2,346,461 | Shackleton | Apr. 11, 1944 |
| 2,612,037 | Van Rooy | Sept. 30, 1952 |
| 2,621,268 | Lindstrom et al. | Dec. 9, 1952 |

FOREIGN PATENTS

| | | |
|---|---|---|
| 35,023 | Netherlands | Feb. 16, 1935 |